(12) United States Patent
Nishio (10) Patent No.: US 12,506,377 B2
(45) Date of Patent: Dec. 23, 2025

(54) ELECTRIC MOTOR AND COMPRESSOR

(71) Applicant: FUJITSU GENERAL LIMITED, Kanagawa (JP)

(72) Inventor: Tomoki Nishio, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 236 days.

(21) Appl. No.: 18/281,065

(22) PCT Filed: Mar. 22, 2022

(86) PCT No.: PCT/JP2022/013075
§ 371 (c)(1),
(2) Date: Sep. 8, 2023

(87) PCT Pub. No.: WO2022/202786
PCT Pub. Date: Sep. 29, 2022

(65) Prior Publication Data
US 2024/0146137 A1  May 2, 2024

(30) Foreign Application Priority Data
Mar. 22, 2021 (JP) .................................. 2021-047613

(51) Int. Cl.
*H02K 3/28* (2006.01)
*H02K 3/34* (2006.01)
(52) U.S. Cl.
CPC .............. *H02K 3/345* (2013.01); *H02K 3/28* (2013.01)
(58) Field of Classification Search
CPC ............................ H02K 3/28; H02K 2203/03
See application file for complete search history.

(56) References Cited

U.S. PATENT DOCUMENTS

2015/0035404 A1\* 2/2015 Taema .................. H02K 3/345
310/208
2017/0018985 A1\* 1/2017 Suzuki .................. H02K 3/522
(Continued)

FOREIGN PATENT DOCUMENTS

JP  2013-115949 A   6/2013
JP    5741747 B1    7/2015
(Continued)

OTHER PUBLICATIONS

WO-2017110187-A1 Machine Translation (Year: 2017).\*
(Continued)

*Primary Examiner* — Oluseye Iwarere
*Assistant Examiner* — Masoud Vaziri
(74) *Attorney, Agent, or Firm* — Greenblum & Bernstein, P.L.C.

(57) ABSTRACT

A three-phase electric motor includes a stator iron core, an insulator, and a plurality of coils. The coils are wound around teeth of the stator iron core and a winding body of the insulator. Among the plurality of coils, coils in the same phase are connected by series connection and are formed by one lead wire including connecting wires. A plurality of slits for allowing the connecting wires to pass are formed in the insulator. A deepest slit having the largest depth among the plurality of slits is provided such that at least a part of the deepest slit is located further on an outer side in a circumferential direction than an extension region obtained by virtually extending a corresponding deep groove-winding body, around which a corresponding deep groove-coil from which the connecting wires passing through the deepest slit are drawn is wound, to an outer diameter side.

9 Claims, 9 Drawing Sheets

(56) References Cited

U.S. PATENT DOCUMENTS

| | | | |
|---|---|---|---|
| 2022/0140687 A1* | 5/2022 | Hasegawa | H02K 15/33 62/401 |
| 2022/0263374 A1* | 8/2022 | Nishio | H02K 1/276 |
| 2023/0336044 A1* | 10/2023 | Hasegawa | H02K 3/52 |

FOREIGN PATENT DOCUMENTS

| | | | | |
|---|---|---|---|---|
| JP | 2017-118671 A | 6/2017 | | |
| JP | 2020-182282 A | 11/2020 | | |
| WO | WO-2017110187 A1 * | 6/2017 | | H02K 3/52 |

OTHER PUBLICATIONS

International Search Report in International Application No. PCT/JP2022/013075, dated May 10, 2022, along with an English translation thereof.

* cited by examiner

ELECTRIC MOTOR AND COMPRESSOR

FIELD

The present invention relates to an electric motor and a compressor.

BACKGROUND

An electric motor, including a stator and a rotor, has been known. As the stator, a stator including a stator core that includes a plurality of teeth, an insulator that is attached to an end face in the axial direction of the stator core, and a lead wire (hereinafter also referred to as coil) that is wound around the teeth via the insulator, has been known. Further, for example, in a three-phase electric motor, it has been known that a lead wire connecting coils, which are wound around different teeth, and a lead wire connecting a coil and a wire (hereinafter also referred to as power line) connected to a three-phase power supply, are held by a slit-like holding portion formed in an insulator (Patent Literature 1).

CITATION LIST

Patent Literature

Patent Literature 1: Japanese Patent No. 5741747

SUMMARY

Technical Problem

In the related art, when coils in the same phase are connected by series connection, for example, the lead wire, which is connected to the power line, is drawn out from a slit to the outer side of the insulator without being wound around the teeth first.

However, when the lead wire, which is connected to the power line, is drawn out to the outer side of the insulator without being wound around the teeth first, the number of lead wires (hereinafter also referred to as "connecting wire"), which are laid along the outer circumferential surface of the insulator, is large. Specifically, when a three-phase electric motor in which the number of teeth of a stator is 3N (N: a natural number), connecting wires are needed in N parts for each phase. For example, in Patent Literature 1, three connecting wires are needed in an electric motor including nine teeth. Therefore, it is likely that the length of the insulator increases in the axial direction of the electric motor in order to secure an insulation distance in the connecting wires in different phases.

The disclosed technology has been made in view of the above, and an object thereof is to provide an electric motor and a compressor that can maintain an insulation distance between connecting wires in different phases while suppressing an increase in the length of an insulator in an axial direction by reducing the number of connecting wires.

Solution to Problem

According to an aspect of an embodiments in the present application, a three-phase electric motor includes: a cylindrical stator iron core; a cylindrical insulator that is in contact with an end portion in an axial direction of the stator iron core; and a plurality of coils, wherein the stator iron core includes a plurality of teeth, and a number of teeth is a multiple of three, the insulator includes a plurality of winding bodies, the winding bodies face the teeth in the axial direction, the coils are wound around the teeth and the winding bodies facing each other, among the plurality of coils, coils in a same phase are connected by series connection and are formed by one lead wire including connecting wires, and a plurality of slits for allowing the connecting wires to pass through are formed in the insulator, and when a slit, which has deepest depth among the plurality of slits, is represented as a deepest slit, a coil, from which the connecting wires passing through the deepest slit are drawn, is represented as a corresponding deep groove-coil, and the winding body, around which the corresponding deep groove-coil is wound, is represented as a corresponding deep groove-winding body, the deepest slit is provided such that at least a part of the deepest slit is located further on an outer side in a circumferential direction than an extension region obtained by virtually extending the corresponding deep groove-winding body to an outer diameter side.

Advantageous Effects of Invention

According to one aspect of an electric motor disclosed in the present application, it is possible to reduce the number of connecting wires, and it is possible to keep an insulation distance between the connecting wires in different phases while suppressing an increase in the length of the insulator in the axial direction.

DESCRIPTION OF EMBODIMENTS

Embodiments of an electric motor and a compressor, disclosed in the present application, are explained in detail below with reference to the drawings. Note that the electric motor and the compressor, disclosed in the present application, are not limited by the embodiments explained below.

A three-phase motor and a compressor according to an embodiment, disclosed in the present application, are explained below with reference to the drawings. Note that the technology of the present disclosure is not limited by the following description. In the following description, the same components are denoted by the same reference numerals and signs, and redundant explanation is omitted.

Figure 1:
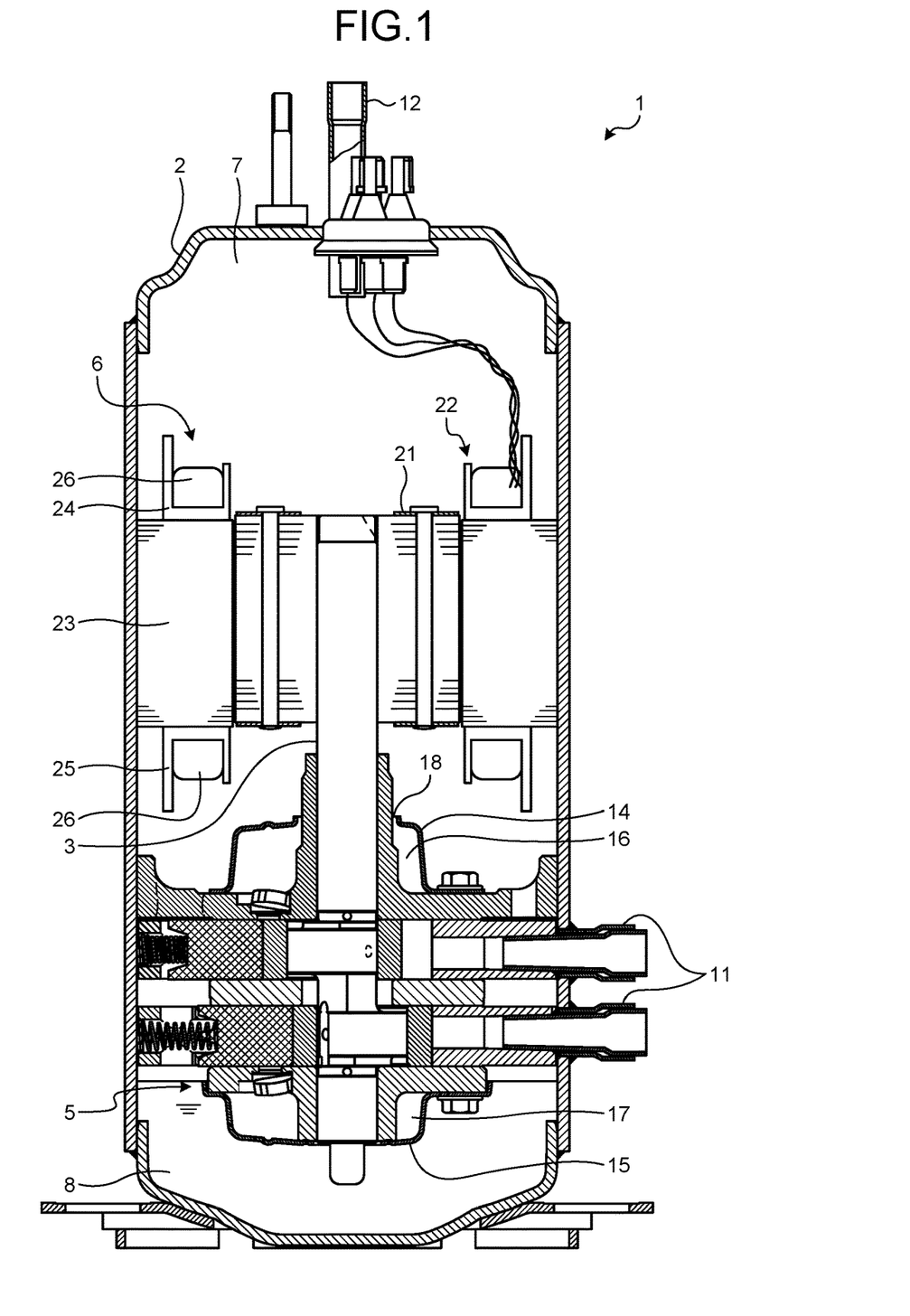
FIG. 1 is a longitudinal sectional view illustrating a compressor provided with a three-phase motor in an embodiment.

FIG. 1 is a longitudinal sectional view illustrating a compressor 1 provided with a three-phase motor 6 (three-phase electric motor) according to an embodiment. As illustrated in FIG. 1, the compressor 1 includes a container 2, a shaft 3, a compressor unit 5, and a three-phase motor 6. The container 2 forms a sealed internal space 7. The internal space 7 is formed in a substantially columnar shape. The container 2 is formed such that the central axis of a column of the internal space 7 is parallel to the vertical direction when the container 2 is vertically placed on the horizontal plane. In the container 2, an oil reservoir 8 is formed in a lower part of the internal space 7. Refrigerating machine oil for lubricating the compressor unit 5 is stored in the oil reservoir 8. A suction pipe 11 for sucking refrigerant and a discharge pipe 12 for discharging compressed refrigerant are connected to the container 2. The shaft 3 is formed in a bar shape and is disposed in the internal space 7 of the container 2 such that one end of the shaft 3 is disposed in the oil reservoir 8. The shaft 3 is supported by the container 2 to be capable of rotating centering on a rotation axis parallel to the central axis of the column formed by the internal space 7. The shaft 3 rotates to thereby supply the refrigerating machine oil, which is stored in the oil reservoir 8, to the compressor unit 5.

The compressor unit 5 is disposed in a lower part of the internal space 7, and is disposed above the oil reservoir 8. The compressor 1 further includes an upper muffler cover 14 and a lower muffler cover 15. The upper muffler cover 14 is disposed in an upper part of the compressor unit 5 in the internal space 7. The upper muffler cover 14 forms upper muffler chamber 16 on the inside thereof. The lower muffler cover 15 is disposed in a lower part of the compressor unit 5 in the internal space 7, and is disposed in an upper part of the oil reservoir 8. The lower muffler cover 15 forms a lower muffler chamber 17 on the inside thereof. The lower muffler chamber 17 communicates with the upper muffler chamber 16 via a communication path (not illustrated) formed in the compressor unit 5. A compressed refrigerant discharge hole 18 is formed between the upper muffler cover 14 and the shaft 3. The upper muffler chamber 16 communicates with the internal space 7 via the compressed refrigerant discharge hole 18.

The compressor unit 5 is a so-called rotary compressor. The shaft 3 rotates, whereby the compressor unit 5 compresses the refrigerant, which is supplied from the suction pipe 11, and supplies the compressed refrigerant to the upper muffler chamber 16 and the lower muffler chamber 17. The refrigerant has compatibility with the refrigerating machine oil. The three-phase motor 6 is disposed above the compressor unit 5 in the internal space 7. The three-phase motor 6 includes a rotor 21 and a stator 22. The rotor 21 is fixed to the shaft 3. The stator 22 (a stator core 23) is formed in a substantially cylindrical shape, disposed to surround the rotor 21, and fixed to the container 2. The stator 22 includes a stator core 23 (a stator iron core), an upper insulator 24 and a lower insulator 25 (insulators), and a plurality of winding wires 26 (coils). The upper insulator 24 is disposed above the stator core 23. The lower insulator 25 is disposed below the stator core 23. That is, the upper insulator 24 is disposed at one end portion of the stator core 23 in the axial direction of the stator core 23. The axial direction of the stator core 23 coincides with the axial direction of the three-phase motor 6, that is, the axial direction of the rotor 21. The lower insulator 25 is disposed at the other end portion of the stator core 23 in the axial direction of the stator core 23. The upper insulator 24 and the lower insulator 25 are examples of an insulating portion that insulates the stator core 23 from the winding wires 26.

Figure 2:
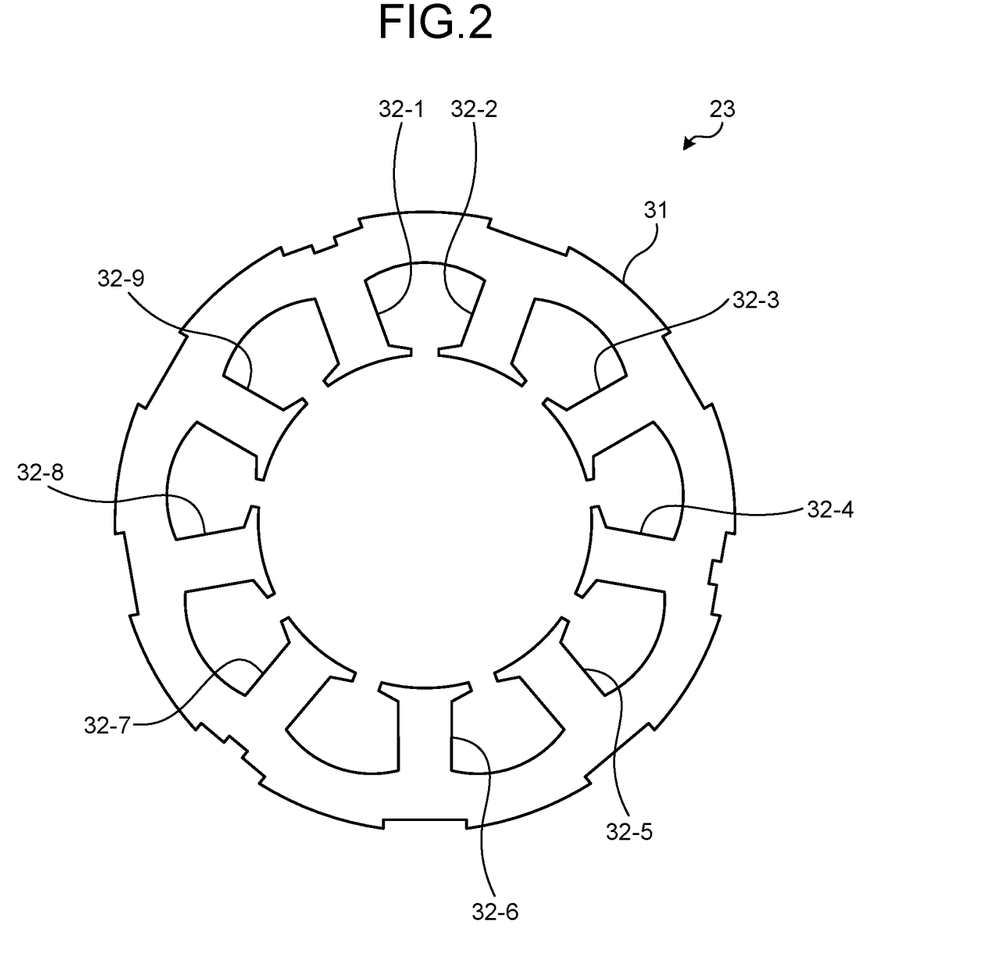
FIG. 2 is a bottom view illustrating a stator core.

FIG. 2 is a bottom view illustrating the stator core 23. The stator core 23 is formed by, for example, stacking a plurality of plates formed of a soft magnetic body, exemplified by a silicon steel plate, and includes a yoke portion 31 and a plurality of stator core tooth portions 32-1 to 32-9 (teeth) as illustrated in FIG. 2. The yoke portion 31 is formed in a substantially cylindrical shape. The plurality of stator core tooth portions 32-1 to 32-9 include nine teeth from a first stator core tooth portion 32-1 to a ninth stator core tooth portion 32-9 along the circumferential direction. The number of teeth of the stator core 23 is a multiple of three. Among the plurality of stator core tooth portions 32-1 to 32-9, the first stator core tooth portion 32-1 is formed in a substantially columnar shape. One end of the first stator core tooth portion 32-1 is formed continuously to the inner circumferential surface of the yoke portion 31, that is, formed to project from the inner circumferential surface of the yoke portion 31. Among the plurality of stator core tooth portions 32-1 to 32-9, a stator core tooth portion different from the first stator core tooth portion 32-1, is also formed in a substantially columnar shape and projects from the inner circumferential surface of the yoke portion 31 like the first stator core tooth portion 32-1. The plurality of stator core tooth portions 32-1 to 32-9 are further formed on the inner circumferential surface of the yoke portion 31 to be disposed at equal intervals for each 40 degrees.

Figure 3:
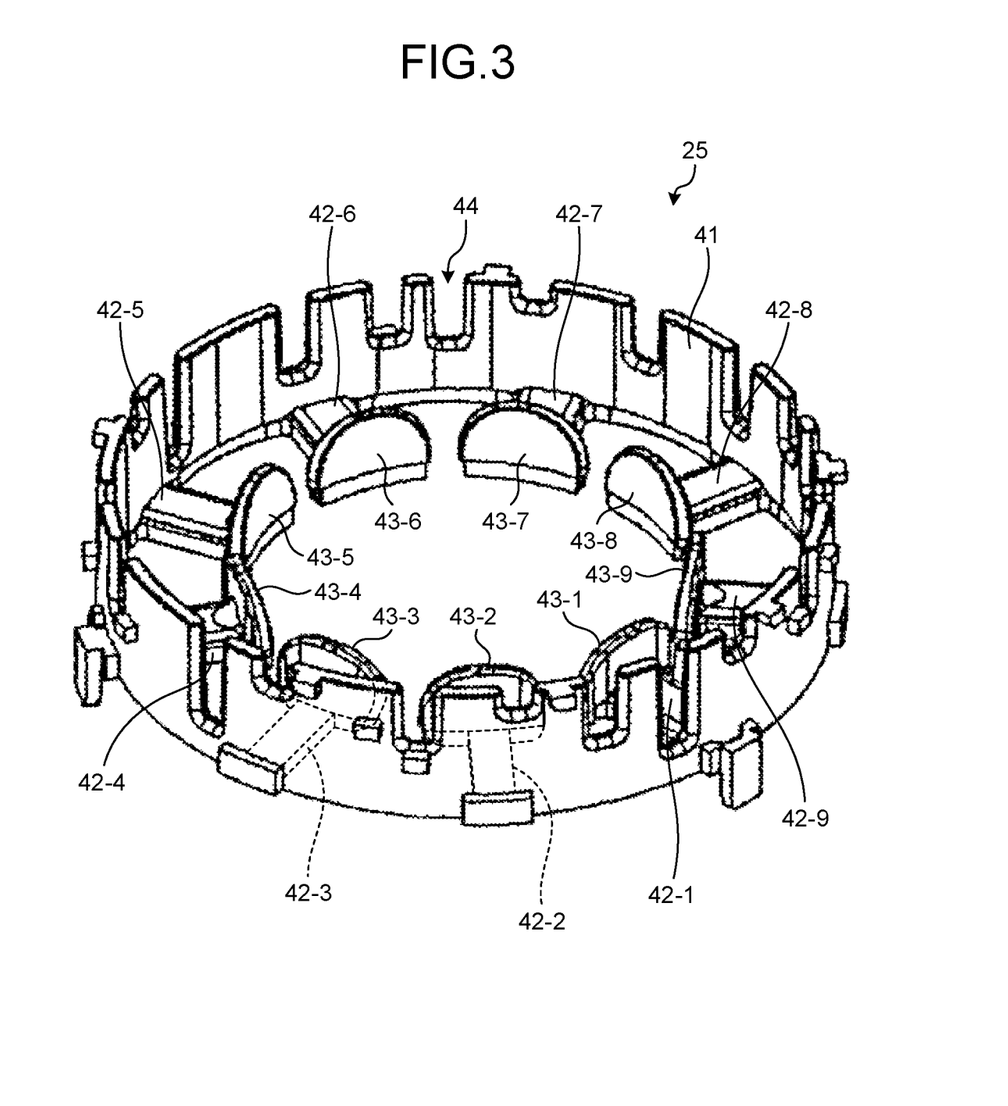
FIG. 3 is a perspective view illustrating a lower insulator.

FIG. 3 is a perspective view illustrating the lower insulator 25. The lower insulator 25 is formed of an insulator exemplified by polybutylene terephthalate resin (PBT), and includes an outer circumferential wall portion 41, a plurality of insulator tooth portions 42-1 to 42-9 (winding bodies), and a plurality of flange portions 43-1 to 43-9 as illustrated in FIG. 3. The outer circumferential wall portion 41 is formed in a substantially cylindrical shape. A plurality of slits 44 are formed in the outer circumferential wall portion 41. Details of the plurality of slits 44 are explained below. The plurality of insulator tooth portions 42-1 to 42-9 face the stator core tooth portions 32-1 to 32-9 corresponding thereto in the axial direction. Among the plurality of insulator tooth portions 42-1 to 42-9, a first insulator tooth portion 42-1 is formed in a rectangular column shape having a substantially semicircular cross section. The first insulator tooth portion 42-1 has one end formed continuously to the inner circumferential surface of the outer circumferential wall portion 41, that is, formed to project from the inner circumferential surface of the outer circumferential wall portion 41. Among the plurality of insulator tooth portions 42-1 to 42-9, an insulator tooth portion different from the first insulator tooth portion 42-1, is also formed in a rectangular column shape and is formed to project from the inner circumferential surface of the outer circumferential wall portion 41 like the first insulator tooth portion 42-1. The plurality of insulator tooth portions 42-1 to 42-9 are formed to be disposed at equal intervals for every 40 degrees on the inner circumferential surface of the outer circumferential wall portion 41.

The plurality of flange portions 43-1 to 43-9 correspond to the plurality of insulator tooth portions 42-1 to 42-9, and are respectively formed in a substantially semicircular plate shape. Among the plurality of flange portions 43-1 to 43-9, a first flange portion 43-1 corresponding to the first insulator tooth portion 42-1, is formed continuously to the other end of the first insulator tooth portion 42-1. Among the plurality of flange portions 43-1 to 43-9, a flange portion different from the first flange portion 43-1, is also formed continuously to the other ends of the plurality of insulator tooth portions 42-1 to 42-9 like the first flange portion 43-1.

The upper insulator 24 is also formed like the lower insulator 25, that is, formed of an insulator, and includes an outer circumferential wall portion, a plurality of insulator tooth portions, and a plurality of flange portions.

Figure 4:
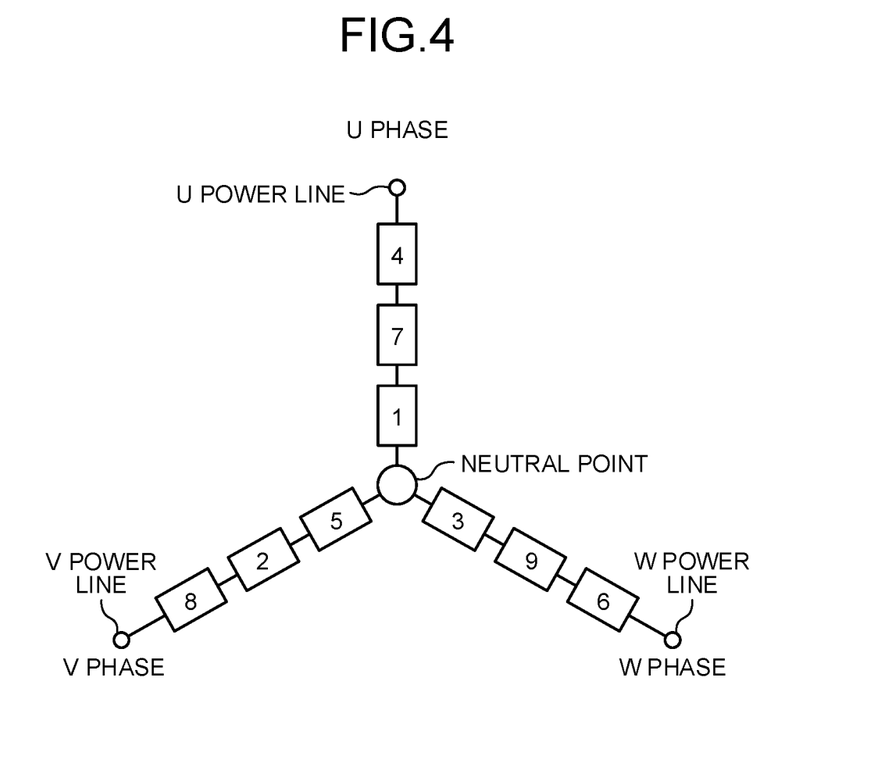
FIG. 4 is a connection diagram in the case in which series connection is performed.
Figure 5:
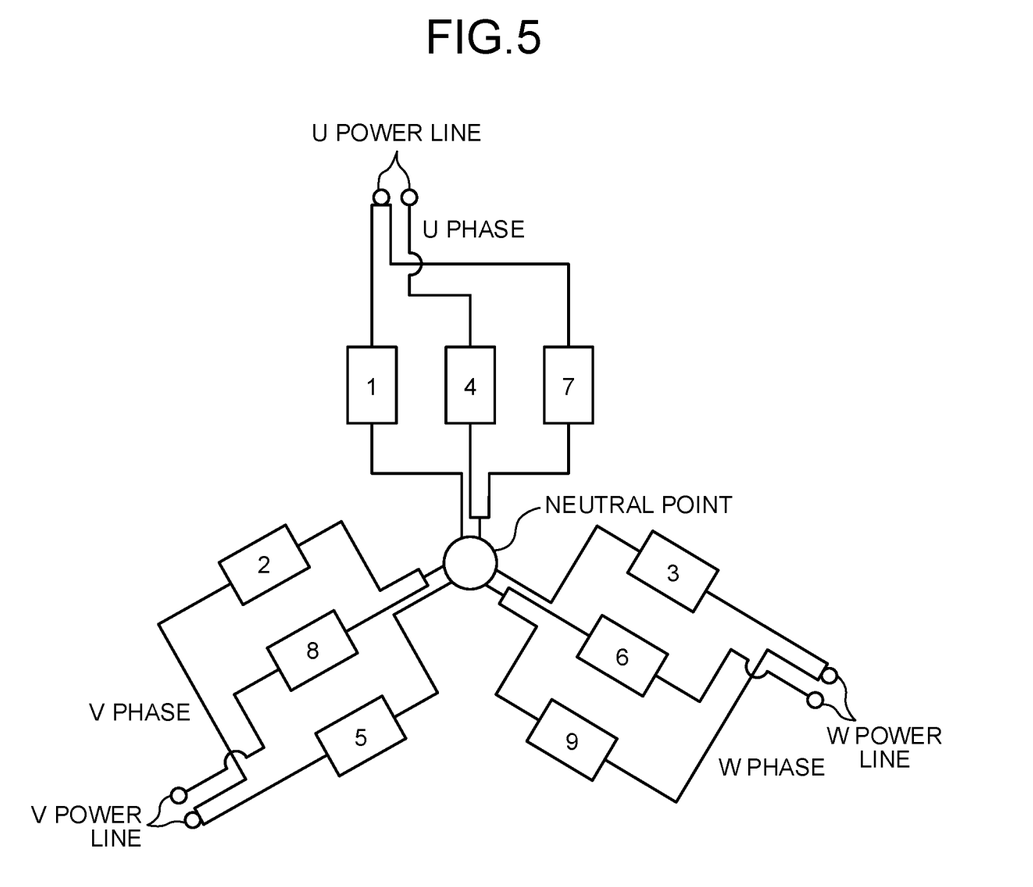
FIG. 5 is a connection diagram in the case in which parallel connection is performed.

In the stator core 23 including the nine stator core tooth portions 32-1 to 32-9, a method of connecting the winding wires 26 in each phase includes series connection (hereinafter also referred to as series star connection) for connecting three windings ("1, 4, 7", "2, 5, 8", and "3, 6, 9") in each phase in series as illustrated in FIG. 4 and parallel connection (hereinafter also referred to as parallel star connection) for connecting the three windings ("1, 4, 7", "2, 5, 8", and "3, 6, 9") in each phase in parallel as illustrated in FIG. 5. In the present embodiment, the upper insulator 24 and the lower insulator 25 can be used irrespective of winding methods in each phase. That is, the upper insulator 24 and the lower insulator 25 are used as common components regardless of the winding methods in each phase. FIG. 4 is a connection diagram in the case in which the series connection is performed. FIG. 5 is a connection diagram in the case in which the parallel connection is performed.

Figure 6:
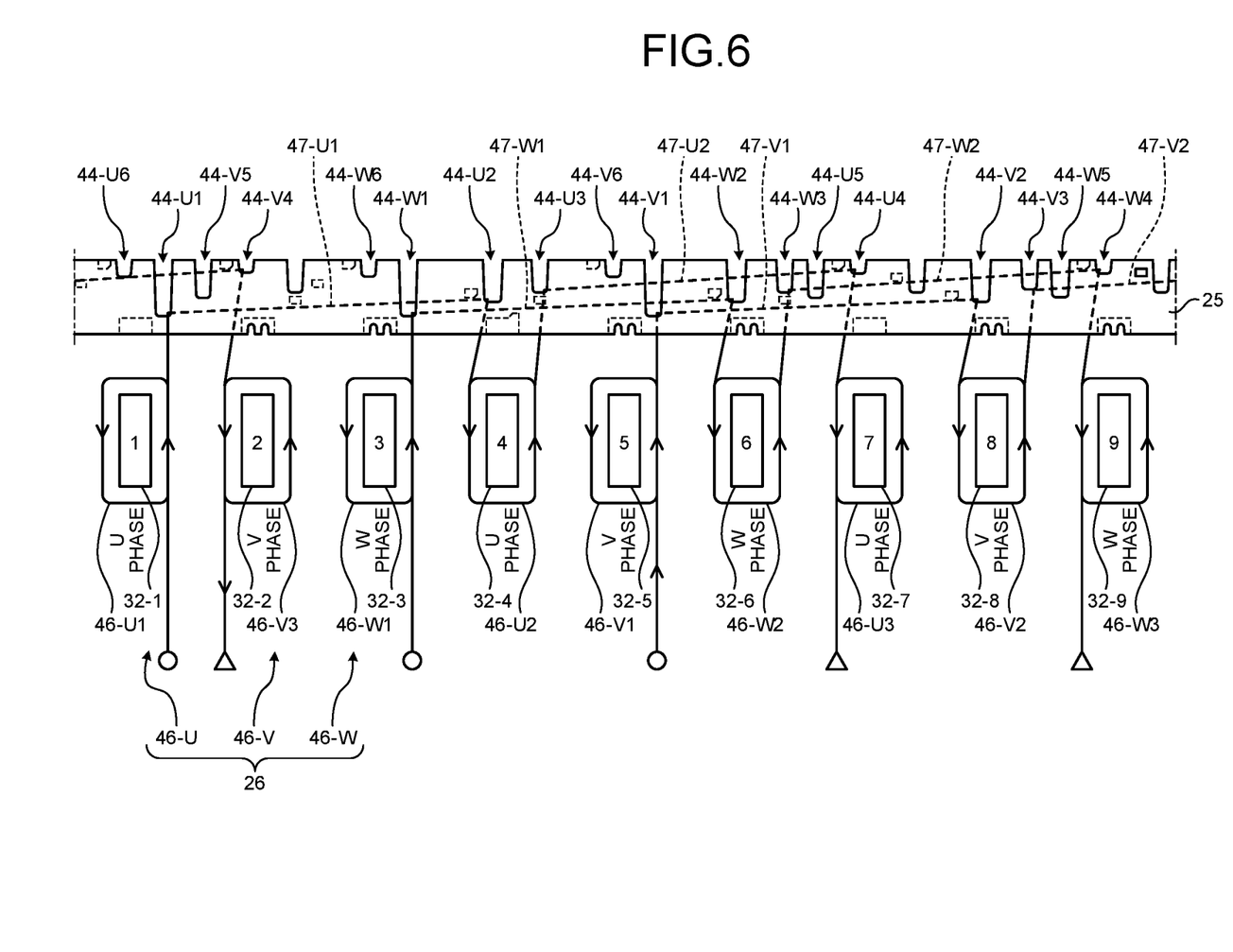
FIG. 6 is a developed view illustrating a plurality of windings in the series connection.

FIG. 6 is a developed view illustrating the plurality of winding wires 26 in the series connection. Note that, in FIG. 6, "○" means connection to a power line. In FIG. 6, "Δ" means connection to a neutral point. The plurality of winding wires 26 includes a U-phase winding wire 46-U, a V-phase winding wire 46-V, and a W-phase winding wire 46-W.

The U-phase winding wire 46-U includes a first U-phase winding wire 46-U1, a second U-phase winding wire 46-U2, a third U-phase winding wire 46-U3, a first U-phase connecting wire 47-U1, and a second U-phase connecting wire 47-U2. The U-phase winding wire 46-U is formed by one lead wire.

The first U-phase winding wire 46-U1 (a first coil) is wound around the first stator core tooth portion 32-1. The second U-phase winding wire 46-U2 (a fourth coil) is wound around the fourth stator core tooth portion 32-4. The third U-phase winding wire 46-U3 (a seventh coil) is wound around the seventh stator core tooth portion 32-7.

Note that the first U-phase winding wire 46-U1 (the first coil) is wound around the first insulator tooth portion 42-1 (see FIG. 3) of the lower insulator 25, the first stator core tooth portion 32-1, and the first insulator tooth portion of the upper insulator 24. Similarly, the other windings are wound around the insulator tooth portion of the lower insulator 25, the stator core tooth portion, and the insulator tooth portion of the upper insulator 24. As explained in detail below, in the present embodiment, the first U-phase winding wire 46-U1 (the first coil) is a corresponding deep groove-coil in the U phase, and the first insulator tooth portion 42-1 is a corresponding deep groove-winding body in the U phase. The first U-phase winding wire 46-U1 and the second U-phase winding wire 46-U2 are connected by the first U-phase connecting wire 47-U1. The second U-phase winding wire 46-U2 and the third U-phase winding wire 46-U3 are connected by the second U-phase connecting wire 47-U2.

The U-phase winding wire 46-U is wound around the first stator core tooth portion 32-1 and the first insulator tooth portion 42-1 to form a first U-phase winding wire 46-U1, and thereafter drawn out to the outer circumference side of the lower insulator 25 via a first U-phase slit 44-U1, which is a U-phase deepest slit explained below. The U-phase winding wire 46-U is drawn out to the inner circumference side of the lower insulator 25 via a second U-phase slit 44-U2, and wound around the fourth stator core tooth portion 32-4. Consequently, the second U-phase winding wire 46-U2 is formed. The first U-phase connecting wire 47-U1 is formed between the first U-phase winding wire 46-U1 and the second U-phase winding wire 46-U2.

Subsequently, the U-phase winding wire 46-U is drawn out to the outer circumference side of the lower insulator 25 via a third U-phase slit 44-U3, thereafter drawn out to the inner circumference side of the lower insulator 25 via a fourth U-phase slit 44-U4, and wound around the seventh stator core tooth portion 32-7. Consequently, the third U-phase winding wire 46-U3 is formed. The second U-phase connecting wire 47-U2 is formed between the second U-phase winding wire 46-U2 and the third U-phase winding wire 46-U3. The U-phase winding wire 46-U is connected to the neutral point after forming the third U-phase winding wire 46-U3.

The V-phase winding wire 46-V includes a first V-phase winding wire 46-V1, a second V-phase winding wire 46-V2, a third V-phase winding wire 46-V3, a first V-phase connecting wire 47-V1, and a second V-phase connecting wire 47-V2. The V-phase winding wire 46-V is formed by one lead wire.

The first V-phase winding wire 46-V1 is wound around the fifth stator core tooth portion 32-5. The second V-phase winding wire 46-V2 is wound around the eighth stator core tooth portion 32-8. The third V-phase winding wire 46-V3 is wound around the second stator core tooth portion 32-2.

The first V-phase winding wire 46-V1 and the second V-phase winding wire 46-V2 are connected by the first V-phase connecting wire 47-V1. The second V-phase winding wire 46-V2 and the third V-phase winding wire 46-V3 are connected by the second V-phase connecting wire 47-V2.

The V-phase winding wire 46-V is wound around the fifth stator core tooth portion 32-5 to form the first V-phase winding wire 46-V1, and thereafter drawn out to the outer circumference side of the lower insulator 25 via a first V-phase slit 44-V1. The V-phase winding wire 46-V is drawn out to the inner circumference side of the lower insulator 25 via a second V-phase slit 44-V2, and wound around the eighth stator core tooth portion 32-8. Consequently, the second V-phase winding wire 46-V2 is formed. The first V-phase connecting wire 47-V1 is formed between the first V-phase winding wire 46-V1 and the second V-phase winding wire 46-V2.

Subsequently, the V-phase winding wire 46-V is drawn out to the outer circumference side of the lower insulator 25 via a third V-phase slit 44-V3, thereafter drawn out to the inner circumference side of the lower insulator 25 via a fourth V-phase slit 44-V4, and wound around the second stator core tooth portion 32-2. Consequently, the third V-phase winding wire 46-V3 is formed. The second V-phase connecting wire 47-V2 is formed between the second V-phase winding wire 46-V2 and the third V-phase winding wire 46-V3. The V-phase winding wire 46-V is connected to the neutral point after forming the third V-phase winding wire 46-V3.

The W-phase winding wire 46-W includes a first W-phase winding wire 46-W1, a second W-phase winding wire 46-W2, a third W-phase winding wire 46-W3, a first W-phase connecting wire 47-W1, and a second W-phase connecting wire 47-W2. The W-phase winding wire 46-W is formed by one lead wire.

The first W-phase winding wire 46-W1 is wound around the third stator core tooth portion 32-3. The second W-phase winding wire 46-W2 is wound around the sixth stator core tooth portion 32-6. The third W-phase winding wire 46-W3 is wound around the ninth stator core tooth portion 32-9.

The first W-phase winding wire 46-W1 and the second W-phase winding wire 46-W2 are connected by the first W-phase connecting wire 47-W1. The second W-phase winding wire 46-W2 and the third W-phase winding wire 46-W3 are connected by the second W-phase connecting wire 47-W2.

The W-phase winding wire 46-W is wound around the third stator core tooth portion 32-3 to form the first W-phase winding wire 46-W1, and thereafter drawn out to the outer circumference side of the lower insulator 25 via a first W-phase slit 44-W1. The W-phase winding wire 46-W is drawn out to the inner circumference side of the lower insulator 25 via a second W-phase slit 44-W2, and wound around the sixth stator core tooth portion 32-6. Consequently, the second W-phase winding wire 46-W2 is formed. In addition, the first W-phase connecting wire 47-W1 is formed between the first W-phase winding wire 46-W1 and the second W-phase winding wire 46-W2.

Subsequently, the W-phase winding wire 46-W is drawn out to the outer circumference side of the lower insulator 25 via a third W-phase slit 44-W3, thereafter drawn out to the inner circumference side of the lower insulator 25 via a fourth W-phase slit 44-W4, and wound around the ninth stator core tooth portion 32-9. Consequently, the third W-phase winding wire 46-W3 is formed. The second W-phase connecting wire 47-W2 is formed between the second W-phase winding wire 46-W2 and the third W-phase winding wire 46-W3. The W-phase winding wire 46-W is connected to the neutral point after forming the third W-phase winding wire 46-W3.

Figure 7:
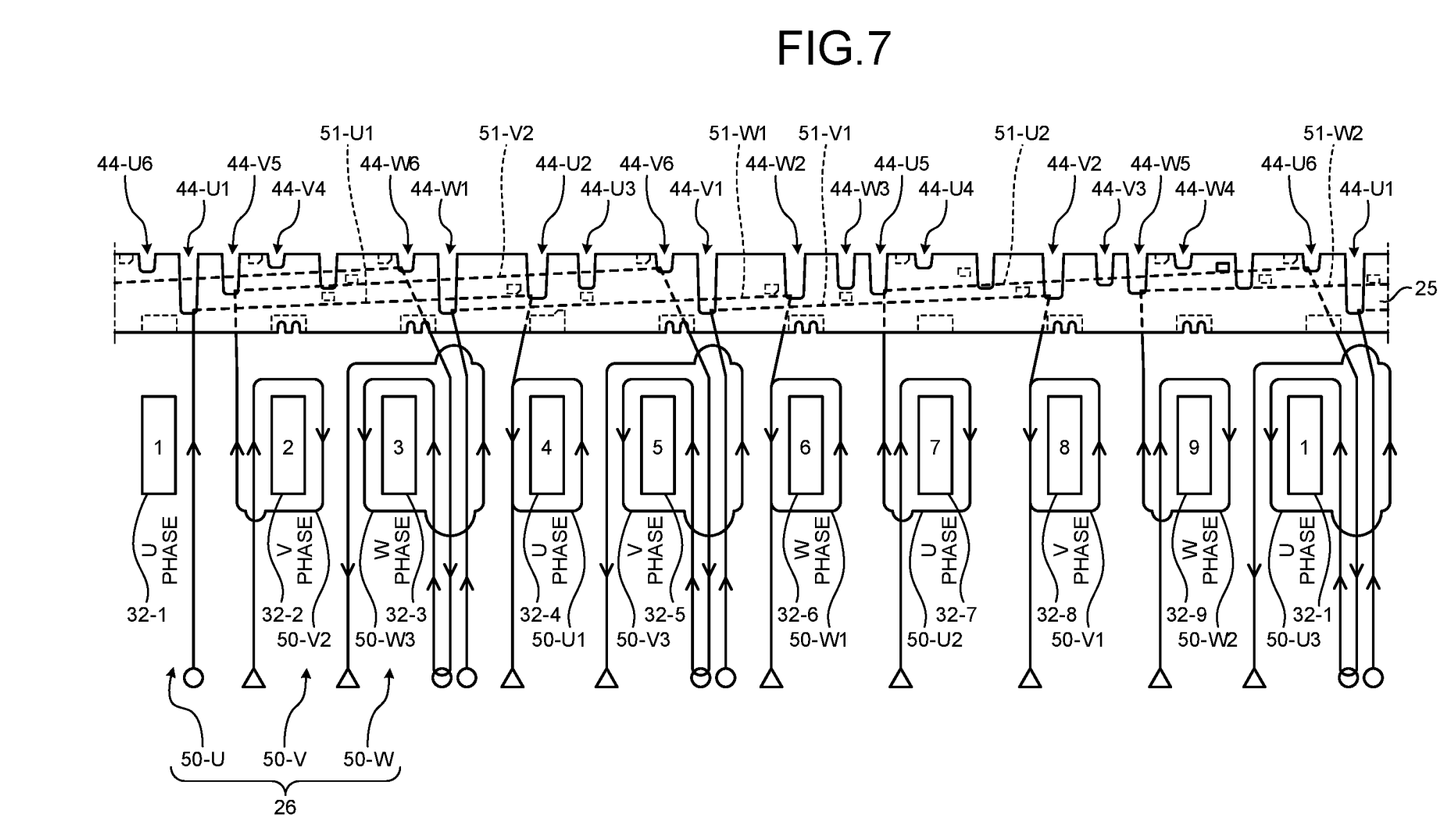
FIG. 7 is a developed view illustrating a plurality of windings in the parallel connection.

FIG. 7 is a developed view illustrating a plurality of winding wires 26 in the parallel star connection. In FIG. 7, "○" means connection to a power line. In FIG. 7, "Δ" means connection to a neutral point. The plurality of winding wires 26 includes a U-phase winding wire 50-U, a V-phase winding wire 50-V, and a W-phase winding wire 50-W.

The U-phase winding wire 50-U includes a first U-phase winding wire 50-U1, a second U-phase winding wire 50-U2, a third U-phase winding wire 50-U3, a first U-phase connecting wire 51-U1, and a second U-phase connecting wire 51-U2.

The first U-phase winding wire 50-U1 is wound around the fourth stator core tooth portion 32-4. The second U-phase winding wire 50-U2 is wound around the seventh stator core tooth portion 32-7. The third U-phase winding wire 50-U3 is wound around the first stator core tooth portion 32-1.

One end of the first U-phase winding wire 50-U1 is connected to the first U-phase connecting wire 51-U1. The first U-phase connecting wire 51-U1 connects the power line and the first U-phase winding wire 50-U1. The other end of the first U-phase winding wire 50-U1 is connected to the neutral point.

The lead wire forming the first U-phase winding wire 50-U1 passes the inner circumference side of the lower insulator 25 from the power line, and is drawn out to the outer circumference side of the lower insulator 25 via the first U-phase slit 44-U1. The lead wire forming the first U-phase winding wire 50-U1 is drawn out to the inner circumference side of the lower insulator 25 via the second U-phase slit 44-U2, and wound around the fourth stator core tooth portion 32-4. Consequently, the first U-phase winding wire 50-U1 is formed. In addition, the first U-phase connecting wire 51-U1 is formed. The lead wire, which forms the first U-phase winding wire 50-U1, is connected to the neutral point after forming the first U-phase winding wire 50-U1.

One end of the second U-phase winding wire 50-U2 is connected to the neutral point. The other end of the second U-phase winding wire 50-U2 is connected to the second U-phase connecting wire 51-U2. The second U-phase connecting wire 51-U2 connects the second U-phase winding wire 50-U2 and the power line.

The lead wire, which forms the second U-phase winding wire 50-U2, is wound around the seventh stator core tooth portion 32-7 from the neutral point. Consequently, the second U-phase winding wire 50-U2 is formed. The lead wire, which forms the second U-phase winding wire 50-U2, is drawn out to the outer circumference side of the lower insulator 25 via a fifth U-phase slit 44-U5 after forming the second U-phase winding wire 50-U2. The lead wire, which forms the second U-phase winding wire 50-U2, is drawn out to the inner circumference side of the lower insulator 25 via a sixth U-phase slit 44-U6 and connected to the power line. Consequently, the second U-phase connecting wire 51-U2 is formed.

One end of the third U-phase winding wire 50-U3 is connected to the power line. The other end of the third U-phase winding wire 50-U3 is connected to the neutral point.

The lead wire, which forms the third U-phase winding wire 50-U3, is wound around the first stator core tooth portion 32-1 from the power line and connected to the neutral point. Consequently, the third U-phase winding wire 50-U3 is formed.

The V-phase winding wire 50-V includes a first V-phase winding wire 50-V1, a second V-phase winding wire 50-V2, a third V-phase winding wire 50-V3, a first V-phase connecting wire 51-V1, and a second V-phase connecting wire 51-V2.

The first V-phase winding wire 50-V1 is wound around the eighth stator core tooth portion 32-8. The second V-phase winding wire 50-V2 is wound around the second stator core tooth portion 32-2. The third V-phase winding wire 50-V3 is wound around the fifth stator core tooth portion 32-5.

One end of the first V-phase winding wire 50-V1 is connected to the first V-phase connecting wire 51-V1. The first V-phase connecting wire 51-V1 connects the power line and the first V-phase winding wire 50-V1. The other end of the first V-phase winding wire 50-V1 is connected to the neutral point.

The lead wire, which forms the first V-phase winding wire 50-V1, passes the inner circumference side of the lower insulator 25 from the power line and is drawn out to the outer circumference side of the lower insulator 25 via the first V-phase slit 44-V1. The lead wire, which forms the first V-phase winding wire 50-V1, is drawn out to the inner circumference side of the lower insulator 25 via the second V-phase slit 44-V2, and wound around the eighth stator core tooth portion 32-8. Consequently, the first V-phase winding wire 50-V1 is formed. The first V-phase connecting wire 51-V1 is formed. The lead wire, which forms the first V-phase winding wire 50-V1, is connected to the neutral point after forming the first V-phase winding wire 50-V1.

One end of the second V-phase winding wire 50-V2 is connected to the neutral point. The other end of the second V-phase winding wire 50-V2 is connected to the second V-phase connecting wire 51-V2. The second V-phase connecting wire 51-V2 connects the second V-phase winding wire 50-V2 and the power line.

The lead wire, which forms the second V-phase winding wire 50-V2, is wound around the second stator core tooth portion 32-2 from the neutral point. Consequently, the second V-phase winding wire 50-V2 is formed. The lead wire, which forms the second V-phase winding wire 50-V2, is drawn out to the outer circumference side of the lower insulator 25 via a fifth V-phase slit 44-V5 after forming the second V-phase winding wire 50-V2. The lead wire, which forms the second V-phase winding wire 50-V2, is drawn out to the inner circumference side of the lower insulator 25 via a sixth V-phase slit 44-V6 and connected to the power line. Consequently, the second V-phase connecting wire 51-V2 is formed.

One end of the third V-phase winding wire 50-V3 is connected to the power line. The other end of the third V-phase winding wire 50-V3 is connected to the neutral point.

The lead wire, which forms the third V-phase winding wire 50-V3, is wound around the fifth stator core tooth portion 32-5 from the power line and connected to the neutral point. Consequently, the third V-phase winding wire 50-V3 is formed.

The W-phase winding wire 50-W includes a first W-phase winding wire 50-W1, a second W-phase winding wire 50-W2, a third W-phase winding wire 50-W3, a first W-phase connecting wire 51-W1, and a second W-phase connecting wire 51-W2.

The first W-phase winding wire 50-W1 is wound around the sixth stator core tooth portion 32-6. The second W-phase winding wire 50-W2 is wound around the ninth stator core tooth portion 32-9. The third W-phase winding wire 50-W3 is wound around the third stator core tooth portion 32-3.

One end of the first W-phase winding wire 50-W1 is connected to the first W-phase connecting wire 51-W1. The other end of the first W-phase winding wire 50-W1 is connected to the neutral point. The first W-phase connecting wire 51-W1 connects the first W-phase winding wire 50-W1 and the power line.

The lead wire, which forms the first W-phase winding wire 50-W1, is drawn out from the power line to the outer circumference side of the lower insulator 25 via the first W-phase slit 44-W1, and thereafter drawn out to the inner circumference side of the lower insulator 25 via the second W-phase slit 44-W2. Consequently, the first W-phase connecting wire 51-W1 is formed. The lead wire, which forms the first W-phase winding wire 50-W1, is wound around the sixth stator core tooth portion 32-6. Consequently, the first W-phase winding wire 50-W1 is formed. The lead wire, which forms the first W-phase winding wire 50-W1, is connected to the neutral point after forming the first W-phase winding wire 50-W1.

One end of the second W-phase winding wire 50-W2 is connected to the neutral point. The other end of the second W-phase winding wire 50-W2 is connected to the second W-phase connecting wire 51-W2. The second W-phase connecting wire 51-W2 connects the second W-phase winding wire 50-W2 and the power line.

The lead wire, which forms the second W-phase winding wire 50-W2, is wound around the ninth stator core tooth portion 32-9 from the neutral point. Consequently, the second W-phase winding wire 50-W2 is formed. The lead wire, which forms the second W-phase winding wire 50-W2, is drawn out from a fifth W-phase slit 44-W5 to the outer circumference side of the lower insulator 25 after forming the second W-phase winding wire 50-W2. The lead wire, which forms the second W-phase winding wire 50-W2, is drawn out from a sixth W-phase slit 44-W6 to the inner circumference side of the lower insulator 25 and thereafter connected to the power line. Consequently, the second W-phase connecting wire 51-W2 is formed.

One end of the third W-phase winding wire 50-W3 is connected to the power line. The third W-phase winding wire 50-W3 is wound around the third stator core tooth portion 32-3. The other end of the third W-phase winding wire 50-W3 is connected to the neutral point.

The lead wire, which forms the third W-phase winding wire 50-W3, is wound around the third stator core tooth portion 32-3 from the power line. Consequently, the third W-phase winding wire 50-W3 is formed. The lead wire, which forms the third W-phase winding wire 50-W3, is connected to the neutral point after forming the third W-phase winding wire 50-W3.

As illustrated in FIG. 4 and FIG. 5, the first U-phase slit 44-U1 to the sixth U-phase slit 44-U6, the first V-phase slit 44-V1 to the sixth V-phase slit 44-V6, and the first W-phase slit 44-W1 to the sixth W-phase slit 44-W6, are formed in the lower insulator 25.

The wire diameter of the winding wire 26 is, for example, 0.65 to 1.05 mm and is smaller than 4 mm. The width of the slits 44 is, for example, width equal to or larger 4 mm or width corresponding to an angle equal to or larger than 5 degrees centering on the axis of the stator core 23.

The first U-phase slit 44-U1, the second U-phase slit 44-U2, the first V-phase slit 44-V1, the second V-phase slit 44-V2, the first W-phase slit 44-W1, and the second W-phase slit 44-W2, are combined use slits through which connecting wires pass at the series connection time and at the parallel connection time.

The third U-phase slit 44-U3, the fourth U-phase slit 44-U4, the third V-phase slit 44-V3, the fourth V-phase slit 44-V4, the third W-phase slit 44-W3, and the fourth W-phase slit 44-W4, are slits for series connection through which connecting wires pass only at the series connection time.

The fifth U-phase slit 44-U5, the sixth U-phase slit 44-U6, the fifth V-phase slit 44-V5, the sixth V-phase slit 44-V6, the fifth W-phase slit 44-W5, and the sixth W-phase slit 44-W6, are slits for parallel connection through which connecting wires pass only at the parallel connection time The depth of the slits 44 is adjusted in order to keep an insulation distance of connecting wires in different phases. Specifically, the depth of the first U-phase slit 44-U1 is larger than the depth of the second U-phase slit 44-U2. The depth of the third U-phase slit 44-U3 is larger than the depth of the fourth U-phase slit 44-U4. The depth of the fifth U-phase slit 44-U5 is larger than the depth of the sixth U-phase slit 44-U6. The same applies to the slit 44 corresponding to the V phase and the slit 44 corresponding to the W phase.

Among the plurality of slits 44, the first U-phase slit 44-U1, the first V-phase slit 44-V1, and the first W-phase slit 44-W1 are the deepest. In the following explanation, the slit 44, which has the largest depth in each phase, is sometimes referred to as deepest slit.

Figure 8:
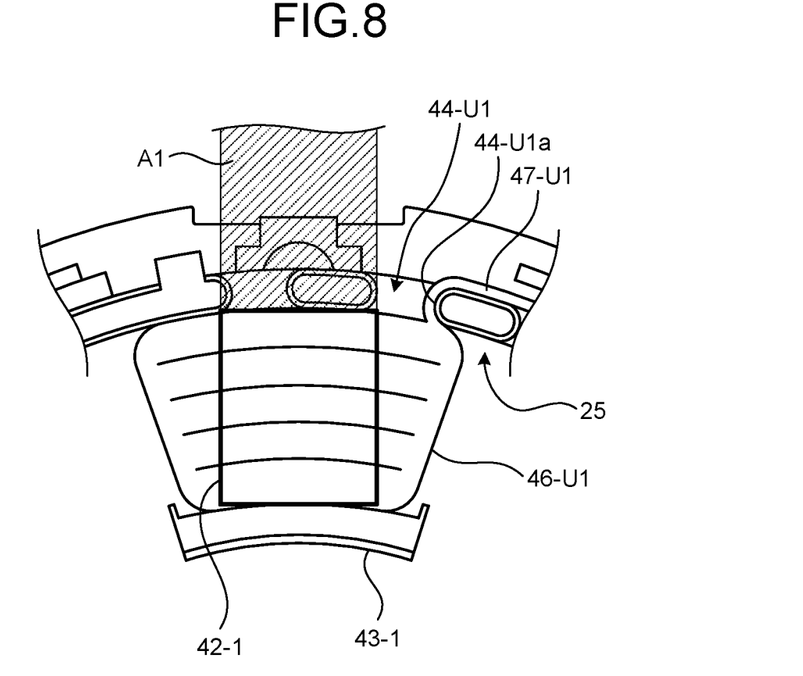
FIG. 8 is a schematic diagram illustrating a state of a first U-phase winding wire in the series connection.

As illustrated in FIG. 8, the slit 44 having the largest depth in each phase, for example, the first U-phase slit 44-U1, which is the deepest slit in the U-phase, is provided such that at least a part of the first U-phase slit 44-U1 is located further on the outer side in the circumferential direction than an extension region A1 obtained by virtually extending the first insulator tooth portion 42-1, which is a U-phase corresponding deep groove-winding body explained below, to the outer diameter side (the outer side in the radial direction). FIG. 8 is a schematic diagram illustrating a state of the first U-phase winding wire 46-U1 in the series connection.

Specifically, when the first U-phase slit 44-U1, which has the largest depth in the U-phase among the plurality of slits, is represented as a U-phase deepest slit, the first U-phase winding wire 46-U1, from which the connecting wire (the first U-phase connecting wire 47-U1) passing through the U-phase deepest slit (the first U-phase slit 44-U1) is drawn out, is represented as a U-phase corresponding deep groove-coil, and the first insulator tooth portion 42-1, around which the U-phase corresponding deep groove-coil (the first U-phase winding wire 46-U1) is wound, is represented as a U-phase corresponding deep groove-winding body, an edge portion 44-U1a of the U-phase deepest slit (the first U-phase slit 44-U1) holding the first U-phase connecting wire 47-U1 drawn out from the first U-phase winding wire 46-U1 (the corresponding deep groove-coil), is provided to be located further on the outer side in the circumferential direction than the extension region A1, which is obtained by virtually extending the U-phase corresponding deep groove-winding body (the first insulator tooth portion 42-1) to the outer diameter side. The edge portion 44-U1a of the first U-phase slit 44-U1 is provided on the outer side of the extension region A1 in a direction in which the first U-phase connecting wire 47-U1 is routed along the lower insulator 25. The same applies to the first V-phase slit 44-V1 and the first W-phase slit 44-W1.

Figure 9:
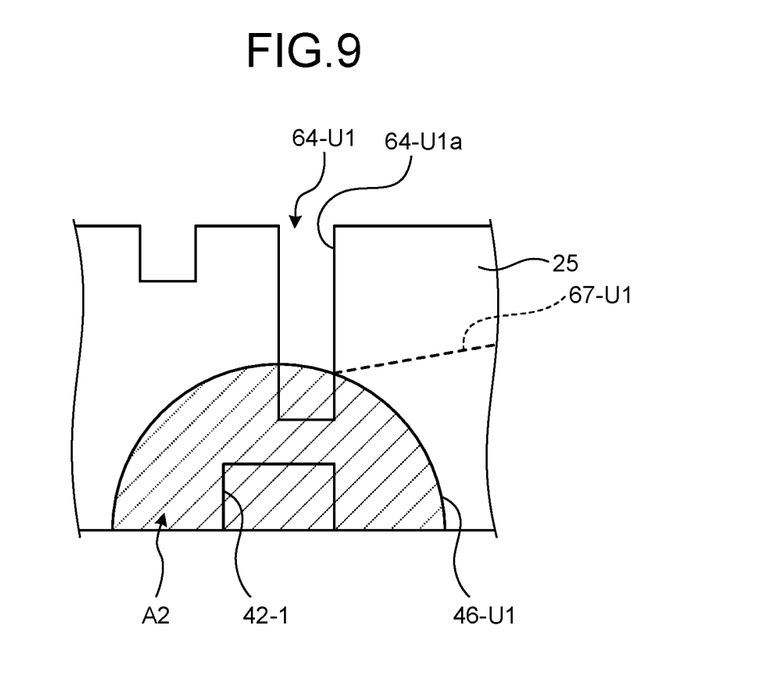
FIG. 9 is a diagram illustrating a state of a first U-phase winding wire in a comparative example.

Here, as a comparative example, when the entire first U-phase slit 64-U1 functioning as the U-phase deepest slit, is within a range of the extension region A1 obtained by virtually extending the first insulator tooth portion 42-1, which is the U-phase corresponding deep groove-winding body, to the outer diameter side and the U-phase winding wire 46-U is connected by the series connection, an edge portion 64-U1a holding the first U-phase connecting wire 67-U1 overlaps a projection region A2 obtained by virtually projecting the first U-phase winding wire 46-U1 to the outer diameter side as illustrated in FIG. 9. Therefore, the vicinity of the bottom of the first U-phase slit 64-U1, which is the U-phase deepest slit, is blocked by the first U-phase winding wire 46-U1. At this time, a drawn-out position of the first U-phase connecting wire 67-U1 in the first U-phase slit 64-U1, is the distal end side of the lower insulator 25 in the axial direction of the stator core 23. That is, the drawn-out position of the first U-phase connecting wire 67-U1 becomes shallow. Therefore, in the three-phase motor 6, the distance between connecting wires in different phases decreases, and it becomes difficult to keep an insulation distance between the connecting wires in the different phases. The connecting wire described herein means a portion laid on the outer circumferential surface of an insulator in a lead wire. FIG. 9 is a diagram illustrating a state of the first U-phase winding wire 46-U1 in the comparative example.

Note that, if the length of the lower insulator 25 in the axial direction is increased, the three-phase motor 6 becomes capable of keeping the insulation distance between the connecting wires in the different phases. However, in this case, since the length of the lower insulator 25 in the axial direction increases, the three-phase motor 6 becomes long in the axial direction, and increases in size.

Figure 10:
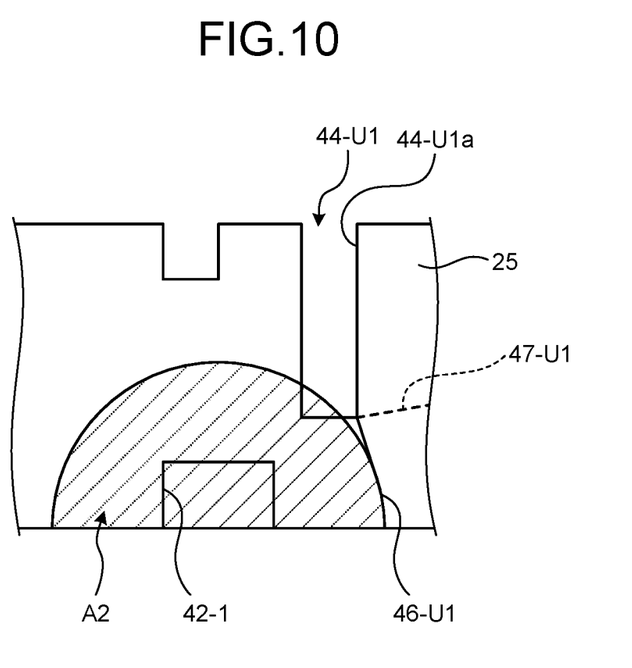
FIG. 10 is a schematic diagram of the first U-phase winding wire in the series connection and a lower insulator that are viewed from a radial direction inner side.

In contrast, in the lower insulator 25 in the embodiment, in the deepest slit 44, which is the deepest slit in each phase among the plurality of slits 44, for example, in the first U-phase slit 44-U1, the edge portion 44-U1a holding the first U-phase connecting wire 47-U1, is provided on the outer side of the projection region A2 not to overlap the projection region A2 where the first U-phase winding wire 46-U1 is virtually projected on the outer diameter side as illustrated in FIG. 10. Therefore, the first U-phase connecting wire 47-U1 is drawn out from the deepest part of the first U-phase slit 44-U1 to the outer circumference side of the lower insulator 25. At this time, the movement of the first U-phase connecting wire 47-U1 to the stator core 23 (see FIG. 1) side in the axial direction, is restricted by the deepest part (the bottom) of the first U-phase slit 44-U1, which is the deepest slit. FIG. 10 is a schematic diagram of the first U-phase winding wire 46-U1 in the series connection and the lower insulator 25 that are viewed from the radial direction inner side. The same applies to the first V-phase slit 44-V1 and the first W-phase slit 44-W1.

Further, in the first U-phase slit 44-U1, the edge portion 44-U1a holding the first U-phase connecting wire 47-U1, is provided further on the first insulator tooth portion 42-1 side than the end of the first U-phase winding wire 46-U1 in the direction in which the first U-phase connecting wire 47-U1 is routed. Consequently, loosening of the first U-phase winding wire 46-U1 is suppressed. The same applies to the first V-phase slit 44-V1 and the first W-phase slit 44-W1.

The three-phase motor 6 includes the cylindrical stator core 23, the cylindrical lower insulator 25 that is in contact with the end portion in the axial direction of the stator core 23, and the plurality of coils (the U-phase winding wires 46-U1 to 46-U3, the V-phase winding wires 46-V1 to 46-V3, and the W-phase winding wires 46-W1 to 46-W3). The stator core 23 includes the plurality of teeth (the stator core tooth portions 32-1 to 32-9). The number of teeth is a multiple of three. The lower insulator 25 includes the plurality of winding bodies (the insulator tooth portions 42-1 to 42-9). The winding bodies (the insulator tooth portions 42-1 to 42-9) face the teeth (the stator core tooth portions 32-1 to 32-9) in the axial direction. The coils (the U-phase winding wires 46-U1 to 46-U3, the V-phase winding wires 46-V1 to 46-V3, the W-phase winding wires 46-W1 to 46-W3), are wound around the teeth (the stator core tooth portions 32-1 to 32-9) and the winding bodies (the insulator tooth portions 42-1 to 42-9) facing each other. Among the plurality of coils, the coils in the same phase, for example, the first U-phase winding wire 46-U1, the second U-phase winding wire 46-U2, and the third U-phase winding wire 46-U3, are connected by the series connection and are formed by one lead wire including the first U-phase connecting wire 47-U1 and the second U-phase connecting wire 47-U2. The plurality of slits 44 for allowing the connecting wires to pass are formed in the lower insulator 25. Among the plurality of slits 44, the slit 44 having the largest depth in each phase, for example, the first U-phase slit 44-U1 (the deepest slit) is provided such that at least a part thereof is located further on the outer side in the circumferential direction than the extension region A1 obtained by virtually extending, to the outer diameter side, the first insulator tooth portion 42-1 (the corresponding deep groove-winding body) around which the first U-phase winding wire 46-U1 (the corresponding deep groove-coil), from which the first U-phase connecting wire 47-U1 is drawn, is wound.

Consequently, for example, when the winding wires 26 in the same phase are connected by the series star connection, in the three-phase motor 6, the connecting wires can be drawn out from predetermined positions (bottom of the slits) of the slits 44 even after the winding wires are wound. Specifically, in the three-phase motor 6, for example, in the first U-phase slit 44-U1, which is the deepest slit in the U-phase of the lower insulator 25, the position where the connecting wires are drawn out, can be set in a predetermined position (the deepest position of the slit 44-U1) even after the first U-phase winding wire 46-U1 is wound. Therefore, in the three-phase motor 6, it is possible to start the routing of the connecting wires from the deepest position while reducing the number of connecting wires. Therefore, in the three-phase motor 6, it is possible to increase the distance of the connecting wires between different phases in the axial direction without increasing the length of the lower insulator 25 in the axial direction, and keep the insulation distance. That is, in the three-phase motor 6, it is possible to keep the insulation distance of the connecting wires between different phases while suppressing an increase in the length of the lower insulator 25 in the axial direction.

In the slit 44 having the largest depth in each phase, for example, the first U-phase slit 44-U1, the edge portion 44-U1a holding the first U-phase connecting wire 47-U1, is provided further on the outer side than the extension region A1 obtained by virtually extending the first insulator tooth portion 42-1 to the outer diameter side in the routing direction of the first U-phase connecting wire 47-U1 (a direction away from the first insulator tooth portion 42-1 in the circumferential direction).

Consequently, the three-phase motor 6 can deepen a draw-out position of the first U-phase connecting wire 47-U1. Therefore, in the three-phase motor 6, it is possible to maintain the insulation distance of the connecting wires between different phases, and suppress an increase in the length of the lower insulator 25 in the axial direction.

In the slit 44 having the largest depth in each phase, for example, the first U-phase slit 44-U1, the edge portion 44-U1a holding the first U-phase connecting wire 47-U1, is provided on the outer side of the projection region A2 not to overlap the projection region A2 obtained by virtually projecting the first U-phase winding wire 46-U1, from which the first U-phase connecting wire 47-U1 is drawn, to the outer diameter side.

Consequently, in the first U-phase slit 44-U1 which is the deepest slit, the edge portion 44-U1a holding the first U-phase connecting wire 47-U1, is not blocked by the first U-phase winding wire 46-U1. Therefore, the first U-phase connecting wire 47-U1 is drawn out from the deepest part of the first U-phase slit 44-U1 to the outer circumference side of the lower insulator 25. Therefore, in the three-phase motor 6, it is possible to deepen the draw-out position of the first U-phase connecting wire 47-U1, keep the insulation distance of the connecting wires between different phases, and suppress an increase in the length of the lower insulator 25 in the axial direction. In the three-phase motor 6, it is possible to prevent the first U-phase connecting wire 47-U1 from moving to the stator core 23 side in the axial direction.

The plurality of winding wires 26 include the nine windings, that is, the first U-phase winding wire 46-U1 to the third U-phase winding wire 46-U3, the first V-phase winding wire 46-V1 to the third V-phase winding wire 46-V3, and the first W-phase winding wire 46-W1 to the third W-phase winding wire 46-W3. When the three windings in the same phase are connected by the series connection, for example, the U-phase winding wire 46-U includes a first U-phase connecting wire 47-U1 and a second U-phase connecting wire 47-U2. The first U-phase connecting wire 47-U1 connects the first U-phase winding wire 46-U1, which is wound around the first stator core tooth portion 32-1, and the second U-phase winding wire 46-U2, which is wound around the fourth stator core tooth portion 32-4. The second U-phase connecting wire 47-U2 connects the second U-phase winding wire 46-U2 and the third U-phase winding wire 46-U3, which is wound around the seventh stator core tooth portion 32-7. In the case of the series connection, the windings in the same phase connect three windings using two connecting wires.

In the case of the series star connection, for example, it is also conceivable that the lead wire is not wound around the first stator core tooth portion 32-1 but is routed to the fourth stator core tooth portion 32-4 by the connecting wire, which passes through the first U-phase slit 44-U1, and wound around the fourth stator core tooth portion 32-4 first, and the U-phase winding wire 46-U is formed.

However, in this case, the three windings in the same phase are connected by the three connecting wires. That is, in a three-phase electric motor in which the number of teeth is 3N (N: a natural number), the number of connecting wires in each phase is N. Therefore, in order to keep the insulation distance between the connecting wires in different phases, the length in the axial direction of the lower insulator 25 needs to be increased. Therefore, the length of the three-phase motor 6 in the axial direction increases. Connecting wires need to be formed in N parts for each of the three phases. There is also a problem that man-hour for winding wires increases.

In contrast, in the three-phase motor 6 in the embodiment, in the case of the series connection, the three coils in the same phase (for example, the first U-phase winding wire 46-U1, the second U-phase winding wire 46-U2, and the third U-phase winding wire 46-U3), are connected by two connecting wires (for example, the first U-phase connecting wire 47-U1 and the second U-phase connecting wire 47-U2). That is, in the three-phase motor 6 in which the number of teeth is 3N (N: a natural number), the number of connecting wires in each phase is N−1. Consequently, in the three-phase motor 6, it is possible to reduce the number of connecting wires. Therefore, in the three-phase motor 6, it is possible to keep the insulation distance between the connecting wires in different phases while suppressing an increase in the length of the lower insulator 25 in the axial direction. Further, since the number of connecting wires to be formed, is only N−1 for each of the three phases, man-hour for winding wires can be reduced.

In the lower insulator 25, the slits for series connection through which the connecting wires in the series connection pass, the slits for parallel connection through which the connecting wires in the parallel connection pass, and the combined use slits through which the connecting wires in the series connection and the parallel connection pass, are formed. In the present embodiment, the deepest slits 44-U1, 44-V1, and 44-W1 in each phase are the combined use slits.

Consequently, the common lower insulator 25 is used regardless of a wire connection method. Therefore, in the three-phase motor 6, it is possible to reduce cost.

Although the embodiment is explained above, the embodiment is not limited by the content explained above. The constituent elements explained above, include constituent elements easily assumed by those skilled in the art, substantially the same constituent elements, and constituent elements in a so-called scope of equivalents. Further, the constituent elements explained above can be combined as appropriate. Further, at least one of various omissions, substitutions, and changes of the constituent elements can be made without departing from the gist of the embodiment.

REFERENCE SIGNS LIST

1 COMPRESSOR
6 THREE-PHASE MOTOR (THREE-PHASE ELECTRIC MOTOR)
23 STATOR CORE (STATOR IRON CORE)
25 LOWER INSULATOR (INSULATOR)
26 WINDING WIRE (COIL)
32-1 to 32-9 STATOR CORE TOOTH PORTION (TOOTH)

42-1 to 42-9 INSULATOR TOOTH PORTION (WINDING BODY)
42-1 FIRST INSULATOR TOOTH PORTION (CORRESPONDING DEEP GROOVE-WINDING BODY)
43-1 to 43-9 FLANGE PORTION
44 SLIT
44-U1a EDGE PORTION
46-U U-PHASE WINDING WIRE
46-U1 FIRST U-PHASE WINDING WIRE (FIRST COIL, CORRESPONDING DEEP GROOVE-COIL)
46-U2 SECOND U-PHASE WINDING WIRE (FOURTH COIL)
46-U3 THIRD U-PHASE WINDING WIRE (SEVENTH COIL)
46-V V-PHASE WINDING WIRE
46-W W-PHASE WINDING WIRE
47-U1 FIRST U-PHASE CONNECTING WIRE
47-U2 SECOND U-PHASE CONNECTING WIRE
47-V1 FIRST V-PHASE CONNECTING WIRE
47-V2 SECOND V-PHASE CONNECTING WIRE
47-W1 FIRST W-PHASE CONNECTING WIRE
47-W2 SECOND W-PHASE CONNECTING WIRE
44-U1 FIRST U-PHASE SLIT (DEEPEST SLIT, COMBINED USE SLIT)
44-U2 SECOND U-PHASE SLIT (COMBINED USE SLIT)
44-U3 THIRD U-PHASE SLIT (SLIT FOR SERIES CONNECTION)
44-U4 FOURTH U-PHASE SLIT (SLIT FOR SERIES CONNECTION)
44-U5 FIFTH U-PHASE SLIT (SLIT FOR PARALLEL CONNECTION)
44-U6 SIXTH U-PHASE SLIT (SLIT FOR PARALLEL CONNECTION)
44-V1 FIRST V-PHASE SLIT (DEEPEST SLIT, COMBINED USE SLIT)
44-W1 FIRST W-PHASE SLIT (DEEPEST SLIT, COMBINED USE SLIT)

The invention claimed is:

1. A three-phase electric motor comprising:
a cylindrical stator iron core;
a cylindrical insulator that is in contact with an end portion in an axial direction of the stator iron core; and
a plurality of coils, wherein
the stator iron core includes a plurality of teeth, and a number of teeth is a multiple of three,
the insulator includes a plurality of winding bodies,
the winding bodies face the teeth in the axial direction,
the coils are wound around the teeth and the winding bodies facing each other,
among the plurality of coils, coils in a same phase are connected by series connection and are formed by one lead wire including connecting wires, and
a plurality of slits for allowing the connecting wires to pass through are formed in an outer circumferential wall portion of the insulator,
when a slit, which has deepest depth among the plurality of slits, is represented as a deepest slit, a coil, from which the connecting wires passing through the deepest slit are drawn, is represented as a corresponding deep groove-coil, and the winding body, around which the corresponding deep groove-coil is wound, is represented as a corresponding deep groove-winding body, the deepest slit includes an edge portion to hold the connecting wires drawn out from a winding end of the corresponding deep groove-coil and the edge portion is located further on an outer side in a circumferential direction of the outer circumferential wall portion than an extension region obtained by virtually extending the corresponding deep groove-winding body to an outer diameter side of the outer circumferential wall portion, and
the edge portion of the deepest slit is provided closer to the corresponding deep groove-winding body than an end portion of the corresponding deep groove-coil in a direction away from the corresponding deep groove-winding body in the circumferential direction.

2. The electric motor according to claim 1, wherein the edge portion of the deepest slit is provided away from the corresponding deep groove-winding body in the circumferential direction.

3. The electric motor according to claim 1, wherein the edge portion is provided on an outer side of a projection region where the corresponding deep groove-coil, from which the connecting wires are drawn, is virtually projected on the outer diameter side.

4. The electric motor according to claim 1, wherein
the plurality of coils includes nine coils, and
when the nine coils are represented as a first coil to a ninth coil in arrangement order in the circumferential direction, a lead wire, which forms the first coil, the fourth coil, and the seventh coil, includes
a first connecting wire that connects the first coil and the fourth coil, and
a second connecting wire that connects the fourth coil and the seventh coil.

5. The electric motor according to claim 1, wherein, in the insulator,
a slit for series connection through which the connecting wires pass in the series connection,
a slit for parallel connection through which the connecting wires pass in parallel connection, and
a combined use slit through which the connecting wires pass in the series connection and the parallel connection, are formed.

6. A compressor comprising:
the electric motor according to claim 1; and
a compressing unit that is driven by the electric motor.

7. The electric motor according to claim 1, wherein a bottom of the deepest slit is provided closer to the stator iron core than a distal end of the corresponding deep groove-coil that is opposite to the stator iron core in an axial direction.

8. The electric motor according to claim 5, wherein the deepest slit is the combined use slit.

9. A three-phase electric motor comprising:
a cylindrical stator iron core;
a cylindrical insulator that is in contact with an end portion in an axial direction of the stator iron core; and
a plurality of coils, wherein
the stator iron core includes a plurality of teeth, and a number of teeth is a multiple of three,
the insulator includes a plurality of winding bodies,
the winding bodies face the teeth in the axial direction,
the coils are wound around the teeth and the winding bodies facing each other,
among the plurality of coils, coils in a same phase are connected by series connection and are formed by one lead wire including connecting wires, and
a plurality of slits for allowing the connecting wires to pass through are formed in the insulator, and
when a slit, which has deepest depth among the plurality of slits, is represented as a deepest slit, a coil, from which the connecting wires passing through the deepest slit are drawn, is represented as a corresponding deep groove-coil, and the winding body, around which the corresponding deep groove-coil is wound, is represented as a corresponding deep groove-winding body, the deepest slit is provided such that at least a part of the deepest slit is located further on an outer side in a circumferential direction of the insulator than an extension region obtained by virtually extending the corresponding deep groove-winding body to an outer diameter side of the insulator, wherein an edge portion, which holds the connecting wires in the deepest slit, is provided on an outer side of a projection region where the corresponding deep groove-coil, from which the connecting wires are drawn, is virtually projected on the outer diameter side.

* * * * *